Jan. 11, 1966 D. R. VETERAN 3,228,099

APPARATUS FOR INSERTING ELECTRICAL ELEMENTS IN A CIRCUIT

Filed Oct. 13, 1964

INVENTOR
DAVID ROBERT VETERAN

BY A. C. Smith
ATTORNEY 3,228,099

APPARATUS FOR INSERTING ELECTRICAL ELEMENTS IN A CIRCUIT

David Robert Veteran, Los Altos, Calif., assignor to Hewlett-Packard Company, Palo Alto, Calif., a corporation of California Filed Oct. 13, 1964, Ser. No. 403,575
6 Claims. (Cl. 29—203)

This invention relates to apparatus for inserting at least one of a plurality of electrical elements in a circuit.

It is the principal object of this invention to provide apparatus which comprises a shaft, a turret having a plurality of electrical elements, and means responsive to simple rotation of the shaft for turning the turret to insert the electrical elements singly and successively in an electrical circuit.

Another object of this invention is to provide a high frequency attenuator in which successive steps of attenuation are obtained in response to simple rotation of a shaft.

In accordance with the illustrated embodiment of this invention the apparatus for inserting a plurality of electrical elements singly and successively in an electrical circuit comprises a turret mounted on a shaft. The turret supports a plurality of electrical element containing cartridges which are adapted to be singly and successively locked between a pair of input and output ports as the shaft is rotated to different positions. A spring-loaded detent member having a plurality of recesses and a slip member having a V-groove are fixedly mounted on the shaft adjacent to opposite sides of the turret. When a cartridge is locked between the pair of input and output ports a first ball fits into one of the recesses of the spring-loaded detent member and a pair of spring-loaded balls fits into the V-groove of the slip member. As the shaft is rotated the first ball and the spring-loaded detent member cooperate to lift the shaft and free the locked cartridge. Similarly, the pair of spring-loaded balls and the slip member cooperate to snap the previously locked cartridge quickly and easily away from the pair of input and output ports.

Other and incidental objects of this invention will be apparent from a reading of this specification and an inspection of the accompanying drawing in which.

Figures 1, 2, 3:
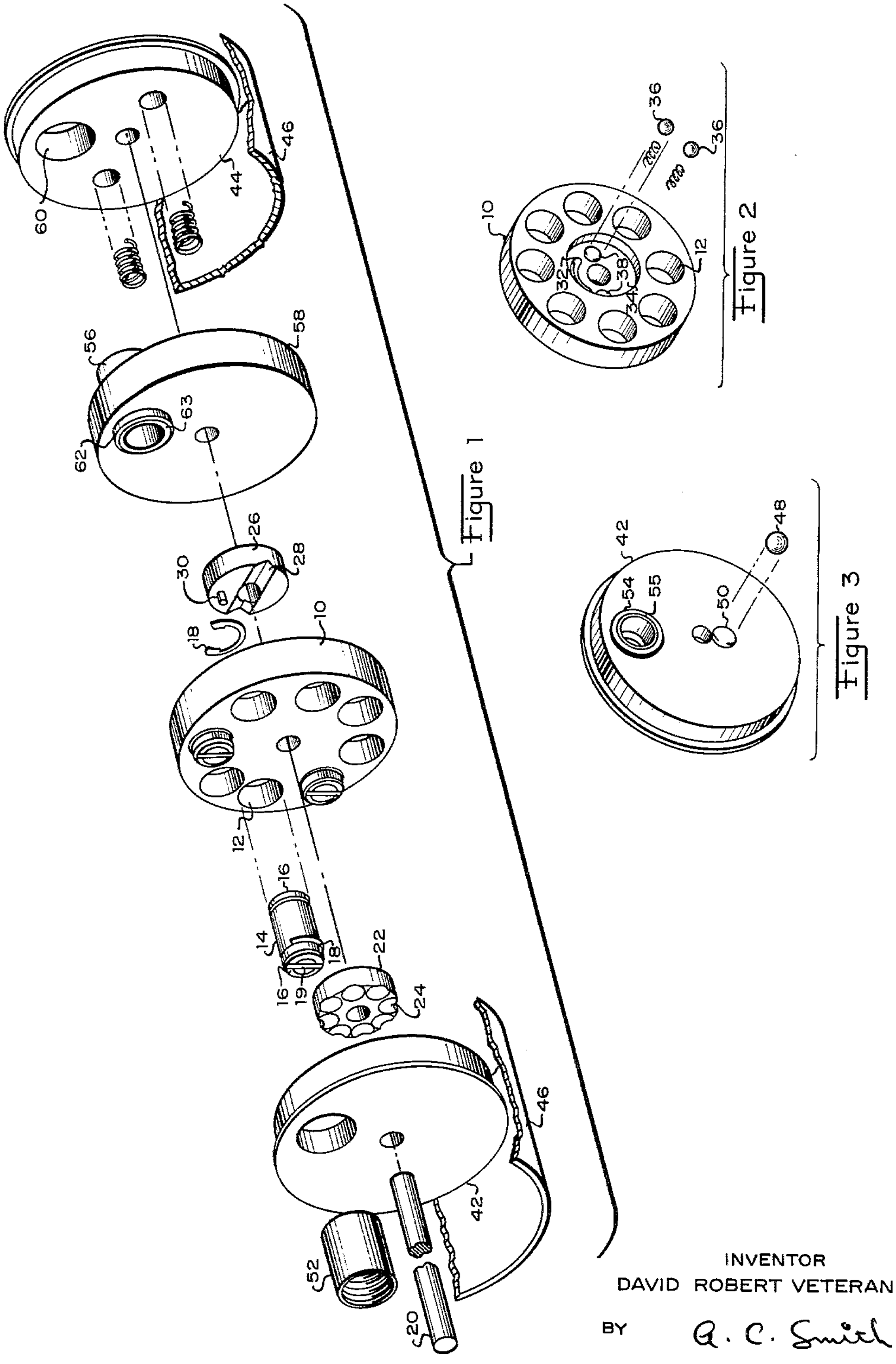
FIGURE 1 is an exploded view of a high frequency attenuator constructed according to this invention.
FIGURE 2 is a view of the back of the turret shown in FIGURE 1.
FIGURE 3 is a view of the back of the first end section shown in FIGURE 1.

Referring now to the drawing, there is shown a circular turret 10 having a plurality of holes 12 symmetrically spaced at a fixed radius therearound. A tubular cartridge 14 having spherically shaped ends 16 is slidably mounted in each of the holes 12 by a pair of spring-clips 18. Cartridges 14 house small fixed attenuators 19 providing successive steps of attenuation. For example, seven cartridges 14 might be used to provide sixty decibels of attenuation in ten decibel steps beginning with zero decibels. The turret 10 is rotatably supported on a shaft 20. A circular detent member 22 having a plurality of spherical recesses 24 corresponding to the number of cartridges 14 is fixedly mounted on shaft 20. The flat side of this detent member 22 abuts upon one side of the turret 10 within the ring of cartridges 14. A circular slip member 26 having a diametrical V-groove 28 is fixedly mounted on shaft 20 adjacent the other side of turret 10. Pin 30 is rigidly mounted on one side of the slip member 26. This pin 30 fits into a slot 32 in a recessed portion 34 of turret 10 (see FIGURE 2). The length of the slot 32 is defined by the angle between the centers of adjacent holes 12.

Slot 32 is adapted to permit movement of the pin 30 therein along a course which is approximately equal to half the length of the slot 32 for either clockwise or counterclockwise rotation of the shaft 20. A pair of spring-loaded balls 36 is inserted into a pair of diametrically opposite wells 38 in the recessed portion 34 of turret 10. Upper portions of these spring-loaded balls 36 fit into the V-groove 28 of slip member 26. The width and depth of V-groove 28 are determined respectively by the length of slot 32 and the torque desired for turning shaft 20. Shaft 20 is rotatably supported by a housing which is concentric with turret 10. The housing comprises circular end sections 42 and 44 and a cylindrical outer jacket 46 shown cutaway. A ball 48 is inserted into a well 50 in end section 42 (see FIGURE 3). The upper portion of ball 48 fits into one of the spherical recesses 24 of detent member 22. An input connector 52 is also rigidly mounted in end section 42 and extended therethrough to form a circular collar 54 having a spherically indented face 55. Similarly, an output connector 56 is rigidly mounted in a spring-loaded plate 58 which is positioned adjacent to end section 44 and which serves to spring-load the detent member 22. Output connector 56 fits slidably into a hole 60 in end section 44 to allow compression of spring-loaded plate 58 which abuts upon the flat side of slip member 26. The output connector 56 also extends through spring-loaded plate 58 to form a circular collar 62 which is co-linear with the circular collar 54 and which also has a spherically indented face 63. The spherically shaped ends 16 of a cartridge 14 are adapted to fit into the spherically indented faces 55 and 63 of respective collars 54 and 62 to form a ball joint therewith and lock the cartridge 14 between the input and output connectors 52 and 56. A knob (not shown) for supplying torque is fixedly mounted on the end of shaft 20 which extends through end section 42.

When the knob mounted on the shaft 20 is turned, the detent member 22 and the slip member 26 rotate. This causes the ball 48 to ride on the portion of the detent member 22 comprised between two adjacent recesses 24 thereby lifting the shaft 20. Shaft 20 is lifted sufficiently to raise the locked cartridge 14 and compress the spring-loaded plate 58 so that the spherically shaped ends 16 of the locked cartridge 14 may be smoothly disengaged from the spherically indented faces 55 and 63 of respective collars 54 and 62. Simultaneously, the pin 30 is moved in the slot 32 thereby causing spring-loaded balls 36 to ride towards the top of the V-groove 28. This exerts a torque on the stationary turret 10. As the pin 30 nears the end of slot 32 the torque exerted on turret 10 becomes sufficient to snap the locked cartridge 14 quickly and easily from engagement with collars 54 and 62, thereby returning the spring-loaded balls 36 to the bottom of the V-groove 28. Turret 10 then merely follows the further rotation of the slip member 26 until the next cartridge 14 is smoothly rotated into engagement with collars 54 and 62. At this point the spring-loaded ball 48 drops into the next successive recess 26 thereby dropping the shaft 20 and fitting the spherically shaped ends 16 of the cartridge 14 into the spherically indented faces 55 and 63 of respective collars 54 and 62. As successive cartridges 14 are locked between the input and output connectors 52 and 56 successive steps of attenuation are provided by the fixed attenuators 19 mounted in the cartridges 14.

I claim:

1. Apparatus for successively inserting electrical elements in a circuit, said apparatus comprising:

a shaft rotatably supported between first and second plates each of which is provided with a signal port adapted for connection in said circuit;

means resiliently biasing said second plate so that it is urged along said shaft towards said first plate;

a turret having a plurality of electrical element cartridges spaced at a fixed radius therearound;

said turret being rotatably mounted on said shaft between said first and second plates so that said cartridges may be successively locked between said signal ports;

a detent member having spaced therearound a plurality of recesses corresponding to the number of said cartridges;

said detent member being fixedly mounted on said shaft adjacent to said first plate and being resiliently biased by said means;

a first ball, seated on said first plate for fitting into one of the recesses of said resiliently biased detent member;

a slip member having a pin rigidly mounted thereon and having a groove;

said slip member being resiliently biased by said means and being fixedly mounted on said shaft between said second plate and said turret with said pin fitting into a slot provided therefor in said turret;

second and third balls which are resiliently biased so that they are urged into said groove along guides formed in said turret;

whereby rotation of said shaft causes said first ball to ride on the portion of said resiliently biased detent member comprised between adjacent recesses, thereby lifting said shaft and unlocking one of said cartridges; and whereby said rotation causes said second and third balls to ride on the portion of said slip member comprised by the top of said groove, thereby exerting a torque on said turret to snap said one cartridge away from said signal ports.

2. Apparatus for inserting electrical elements in a circuit, said apparatus comprising:

a shaft;

a turret having a plurality of said electrical elements, each corresponding to a different shaft position;

said turret being rotatably mounted on said shaft so that said electrical elements are disposed along axes which are parallel to the axis of rotation of said shaft;

means adapted to be connected in said circuit engaging at least one of said electrical elements for each of said shaft positions;

a first spring-loaded member having a plurality of recesses, each corresponding to a different shaft position;

said first spring-loaded member being fixedly mounted on said shaft adjacent to one side of said turret;

an element adapted to fit into a given recess of said first spring-loaded member for each of said shaft positions;

said element being further adapted to ride on the portion of said first spring-loaded member comprised between adjacent recesses as said shaft is rotated, thereby lifting said one electrical element along an axis which is parallel to the axis of rotation of said shaft;

a second spring-loaded member being fixedly mounted on said shaft adjacent to the other side of said turret; and means coupling said second spring-loaded member and said turret to rotate said one electrical element after said shaft is rotated through a selected angle which is less than the angle between successive shaft positions;

whereby the lifting and rotating of said one electrical element disengage it from said first-mentioned means.

3. Apparatus for inserting electrical elements in a circuit, said apparatus comprising:

a shaft;

a turret having a plurality of said electrical elements, each corresponding to a different shaft position;

said turret being rotatably mounted on said shaft;

means adapted to be connected in said circuit engaging at least one of said electrical elements for each of said shaft positions; and other means to disengage said one electrical element from said first-mentioned means as said shaft is rotated between successive shaft positions;

said other means including a spring-loaded member having a plurality of recesses, each corresponding to a different one of said shaft positions;

said spring-loaded member being fixedly mounted on said shaft;

an element adapted to fit into a given recess of said spring-loaded member for each of said shaft positions;

said element being further adapted to ride on the portion of said spring-loaded member comprised between adjacent recesses as said shaft is rotated between successive shaft positions so as to lift said one electrical element along an axis which is parallel to the axis of rotation of said shaft; and means adapted to rotate said one electrical element after said shaft has rotated through a selected angle which is less than the angle between successive shaft positions.

4. A device for inserting at least one of a plurality of elements in a utilization apparatus, said device comprising:

a shaft;

a turret supporting said plurality of elements so that each element corresponds to a different shaft position;

said turret being rotatably mounted on said shaft;

means adapted to be connected in said utilization apparatus engaging said one element along one axis which is parallel to the axis of rotation of said shaft for a selected one of said different shaft positions; and other means to disengage said one element from said first-mentioned means as said shaft is rotated from said selected shaft position;

said other means including a spring-biased member having a plurality of recesses each corresponding to one of said different shaft positions;

said spring-biased member being fixedly mounted on said shaft;

at least one object adapted to fit into a given recess of said spring-biased member for said selected shaft position and to ride on a portion of said member comprised between adjacent recesses as said shaft is rotated from said selected shaft position, thereby moving said one element along said one axis; and means adapted to rotate said one element after said shaft has been rotated through a predetermined angle which is less than the angle between successive ones of said different shaft positions.

5. A device for inserting at least one of a plurality of electrical elements in a circuit, said device comprising a shaft, a turret supporting said plurality of electrical elements said one of which is required to be locked between means adapted to connect it in said circuit, said turret being rotatably mounted on said shaft, a first spring-biased part which is fixedly mounted on said shaft so as to prevent longitudinal movement of said turret in one direction along said shaft, and which is shaped to have a plurality of recesses corresponding one to each of said electrical elements, a fixed member, a ball which is urged along a guide formed in said fixed member and into a given one of said recesses when said one electrical element is locked between said means adapted to connect it in said circuit, said ball being adapted to ride out of said one of the recesses when said first part is rotated so as to lift the turret along the axis of rotation of said shaft and unlock said one electrical element, a second spring-biased part which is fixedly mounted on said shaft so as to prevent longitudinal movement of said turret in the other direction along said shaft, means to mechanically couple said second spring-biased part and said turret so as to permit relative rotation therebetween for a selected angle which is sufficient to allow for the unlocking of said one electrical element in response to simple rotation of said shaft before rotating said one electrical element.

6. Apparatus for successively inserting each of a plurality of electrical elements in a circuit, said apparatus comprising:

a turret which is rotatable about a shaft;

a plurality of electrical elements supported by said turret at angular positions equidistant from said shaft;

a pair of signal ports adapted for connection in said circuit;

resilient means urging said signal ports and one of said electrical elements into contact with one another for connecting said one electrical element in said circuit; and other means responsive to rotation of said shaft for disconnecting said one electrical element from said circuit;

said other means including a member fixedly coupled to said shaft and coacting with said resilient means for moving at least one of said signal ports in a direction away from the other signal port;

said other means including another member fixed to said shaft and adapted to rotate said one electrical element away from said signal ports after said shaft has been rotated through a selected angle.

References Cited by the Examiner

UNITED STATES PATENTS

| | | | |
|---|---|---|---|
| 2,907,040 | 10/1959 | Woods | 29—203 |
| 3,114,199 | 12/1963 | Flodberg | 29—25.19 X |
| 3,149,401 | 9/1964 | Birkbeck | 29—33 |

WHITMORE A. WILTZ, *Primary Examiner.*

THOMAS H. EAGER, *Examiner.*